US012487801B2

United States Patent
Arichandrapandian et al.

(10) Patent No.: US 12,487,801 B2
(45) Date of Patent: Dec. 2, 2025

(54) SYSTEMS AND METHODS FOR DETERMINING SOFTWARE DEPENDENCIES AND SOFTWARE CHANGE IMPACTS ON COMPUTER PROCESSING

(71) Applicant: BANK OF AMERICA CORPORATION, Charlotte, NC (US)

(72) Inventors: Thangaselvi Arichandrapandian, Tamil Nadu (IN); Iruvanti John Dinakar, Telangana (IN); Venkatasubramanian Narayanaswamy, Tamil Nadu (IN); Karthik Rajan Venkataraman Palani, Kovilambakkam (IN); Aravind Ravichandran, Tamil Nadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 101 days.

(21) Appl. No.: 18/584,450

(22) Filed: Feb. 22, 2024

(65) Prior Publication Data

US 2025/0272072 A1 Aug. 28, 2025

(51) Int. Cl.
*G06F 8/41* (2018.01)
*H04L 9/40* (2022.01)

(52) U.S. Cl.
CPC .............. *G06F 8/433* (2013.01); *H04L 63/08* (2013.01)

(58) Field of Classification Search
CPC ................................ G06F 8/433; H04L 63/08
See application file for complete search history.

(56) References Cited

U.S. PATENT DOCUMENTS

| 5,850,505 | A | 12/1998 | Grover | |
|---|---|---|---|---|
| 6,724,722 | B1 | 4/2004 | Wang | |
| 8,244,853 | B1 * | 8/2012 | Raanan | H04L 43/18 |
| | | | | 709/224 |
| 8,914,262 | B2 * | 12/2014 | Zhang | G06F 8/10 |
| | | | | 703/2 |
| 8,997,072 | B1 * | 3/2015 | Wong | G06F 16/955 |
| | | | | 717/157 |
| 9,336,259 | B1 * | 5/2016 | Kane | G06F 11/3409 |
| 9,349,285 | B1 * | 5/2016 | Fowe | G08G 1/096827 |
| 10,191,962 | B2 * | 1/2019 | Shkapenyuk | G06F 16/283 |

(Continued)

*Primary Examiner* — Aravind K Moorthy
(74) *Attorney, Agent, or Firm* — Moore & Van Allen PLLC; Lauren M. Stokes

(57) ABSTRACT

Systems, computer program products, and methods are described herein for determining software dependencies and software change impacts on computer processing. The present disclosure is configured to identify at least one computing component within a network environment; identify historical data for the at least one computing component; apply the historical data to a dependency quotient model; generate, by the dependency quotient model, a dependency quotient based on the at least one computing component, the historical data, and a relationship between the at least one computing component and at least one secondary computing component; and generate, based on the dependency quotient, a system architecture interface component, wherein the system architecture interface component comprises data of the at least one computing component and the at least one secondary computing component within the network environment.

20 Claims, 8 Drawing Sheets

(56) References Cited

U.S. PATENT DOCUMENTS

| | | | |
|---|---|---|---|
| 10,275,449 B1* | 4/2019 | Hayes | G06F 40/205 |
| 10,291,635 B2 | 5/2019 | Muddu | |
| 10,320,626 B1* | 6/2019 | Cross | G06F 11/3006 |
| 10,515,205 B2 | 12/2019 | Eksten | |
| 10,665,251 B1 | 5/2020 | Wood, III | |
| 10,748,099 B1* | 8/2020 | Sadowski | G06Q 10/0639 |
| 10,771,332 B2 | 9/2020 | Mahajan | |
| 10,860,451 B1* | 12/2020 | Murthy | G06F 17/40 |
| 10,949,194 B2 | 3/2021 | Nikam | |
| 11,165,631 B1 | 11/2021 | Chitalia | |
| 11,296,998 B2 | 4/2022 | Jensen-Horne | |
| 11,356,320 B2 | 6/2022 | Cote | |
| 11,494,275 B1* | 11/2022 | Gaudin | G06F 11/3636 |
| 11,500,757 B2 | 11/2022 | Ambichl | |
| 11,562,025 B2 | 1/2023 | Borochoff | |
| 11,588,843 B1* | 2/2023 | Mehta | G06N 20/20 |
| 11,620,300 B2 | 4/2023 | Burnett | |
| 11,637,762 B2 | 4/2023 | Scheib | |
| 11,729,222 B2 | 8/2023 | Soroush | |
| 11,757,720 B2 | 9/2023 | Gershaft | |
| 11,762,855 B1* | 9/2023 | Akidau | G06F 16/24542 707/717 |
| 11,809,271 B1* | 11/2023 | Wang | G06F 11/008 |
| 11,843,622 B1* | 12/2023 | Tellez | H04L 63/1425 |
| 11,893,377 B2* | 2/2024 | Reed | G06F 8/71 |
| 11,912,301 B1* | 2/2024 | Hendy | B60W 60/00276 |
| 11,966,462 B2* | 4/2024 | Krasnov | H04L 9/3236 |
| 12,088,611 B1* | 9/2024 | Lin | H04L 63/20 |
| 12,099,417 B1* | 9/2024 | Paulraj | G06F 11/0709 |
| 12,143,457 B1* | 11/2024 | Shevde | H04B 17/318 |
| 12,184,493 B1* | 12/2024 | Padhy | H04L 41/0859 |
| 12,254,249 B1* | 3/2025 | Cahoon | G06F 30/15 |
| 12,353,856 B2* | 7/2025 | Dahl | G06F 8/36 |
| 2002/0019864 A1 | 2/2002 | Mayer | |
| 2003/0014644 A1 | 1/2003 | Burns | |
| 2008/0222287 A1* | 9/2008 | Bahl | H04L 41/12 709/224 |
| 2009/0172674 A1* | 7/2009 | Bobak | G06F 11/1482 718/101 |
| 2010/0241690 A1* | 9/2010 | Kurapati | H04L 67/1042 709/203 |
| 2011/0276603 A1* | 11/2011 | Bojanic | G06F 16/25 707/E17.011 |
| 2015/0127815 A1* | 5/2015 | Billore | H04L 41/12 709/224 |
| 2019/0146762 A1* | 5/2019 | Singh | G06N 20/00 717/140 |
| 2019/0179608 A1* | 6/2019 | Kothari | G10L 15/1822 |
| 2020/0136891 A1* | 4/2020 | Mdini | H04L 41/069 |
| 2020/0396231 A1* | 12/2020 | Krebs | H04L 63/1425 |
| 2021/0026722 A1* | 1/2021 | Bhatia | G06F 11/079 |
| 2021/0026756 A1* | 1/2021 | Magnezi | G06F 11/3688 |
| 2021/0264025 A1* | 8/2021 | Givental | G06F 18/285 |
| 2021/0266237 A1 | 8/2021 | Savov | |
| 2021/0281592 A1* | 9/2021 | Givental | G06N 20/10 |
| 2021/0312451 A1* | 10/2021 | Allbright | G06N 20/00 |
| 2021/0328878 A1* | 10/2021 | Kantamneni | H04L 41/0226 |
| 2022/0004546 A1 | 1/2022 | Rogers | |
| 2022/0036177 A1* | 2/2022 | Sriharsha | G06F 16/2379 |
| 2022/0050825 A1* | 2/2022 | Ramasamy | G06N 20/10 |
| 2022/0067569 A1* | 3/2022 | Maas | G06F 16/285 |
| 2022/0188083 A1* | 6/2022 | Hicks | G06F 17/16 |
| 2022/0327377 A1* | 10/2022 | Harpaz | G06N 3/04 |
| 2022/0374219 A1* | 11/2022 | Wen | G06F 8/36 |
| 2023/0094029 A1* | 3/2023 | Bie | G06F 9/465 718/106 |
| 2023/0153191 A1* | 5/2023 | Gennetten | G06F 11/0751 714/57 |
| 2023/0168932 A1* | 6/2023 | Rafferty | G06F 9/5027 718/104 |
| 2023/0185923 A1* | 6/2023 | Givental | G06N 3/08 706/12 |
| 2023/0186070 A1* | 6/2023 | Makhija | G06N 5/01 705/318 |
| 2023/0213610 A1* | 7/2023 | Eberspach | G06V 40/166 |
| 2023/0376820 A1* | 11/2023 | Mukherjee | G06N 10/60 |
| 2023/0385836 A1* | 11/2023 | Hughes | G06Q 20/4016 |
| 2023/0396640 A1* | 12/2023 | Miller | H04L 63/1425 |
| 2023/0409703 A1* | 12/2023 | Huang | G06F 21/566 |
| 2024/0013220 A1* | 1/2024 | Martins | G06Q 30/018 |
| 2024/0095549 A1* | 3/2024 | Song | G06N 20/20 |
| 2024/0112042 A1* | 4/2024 | Harris | G06N 20/00 |
| 2024/0187311 A1* | 6/2024 | Nodzak | H04L 41/0681 |
| 2024/0232128 A1* | 7/2024 | Vilim | G06F 15/7871 |
| 2024/0256573 A1* | 8/2024 | Binnal | G06F 16/219 |
| 2024/0311654 A1* | 9/2024 | Samanta | G06N 20/00 |
| 2024/0330266 A1* | 10/2024 | Bush | G06F 16/2358 |
| 2024/0330365 A1* | 10/2024 | Zawadowskiy | G06F 16/9024 |
| 2024/0338310 A1* | 10/2024 | Bendert | G06F 11/3688 |
| 2024/0362097 A1* | 10/2024 | Paulraj | G06F 11/004 |
| 2024/0362196 A1* | 10/2024 | Gupta | G06F 16/2448 |
| 2024/0370570 A1* | 11/2024 | Betthauser | G06F 21/577 |
| 2024/0378031 A1* | 11/2024 | Wu | G06F 8/38 |
| 2025/0004930 A1* | 1/2025 | Chauhan | G06F 11/3688 |
| 2025/0036516 A1* | 1/2025 | Bober | G06F 11/0709 |
| 2025/0045135 A1* | 2/2025 | Athalye | G06F 11/0709 |
| 2025/0077202 A1* | 3/2025 | Antao | G06F 11/3698 |
| 2025/0110795 A1* | 4/2025 | Kliger | G06F 9/5044 |
| 2025/0112972 A1* | 4/2025 | Murray | H04L 67/14 |
| 2025/0148470 A1* | 5/2025 | Allbright | G06Q 20/4016 |
| 2025/0148482 A1* | 5/2025 | Allbright | G06N 7/01 |
| 2025/0209094 A1* | 6/2025 | Mandal | G06F 16/248 |
| 2025/0219894 A1* | 7/2025 | Gupta | H04L 41/0613 |
| 2025/0231367 A1* | 7/2025 | Leech | G01V 1/30 |

* cited by examiner

SYSTEMS AND METHODS FOR DETERMINING SOFTWARE DEPENDENCIES AND SOFTWARE CHANGE IMPACTS ON COMPUTER PROCESSING

TECHNOLOGICAL FIELD

Example embodiments of the present disclosure relate to determining software dependencies and software change impacts on computer processing.

BACKGROUND

In network environments, especially electronic network environments where numerous computing components (e.g., software applications, hardware components, and/or the like) are used and updated regularly, it can be difficult to identify all the dependencies between these computing components. Such dependencies that are not accurately identified and tracked continuously may lead to decreased operational efficiencies, lowered processing times (such as where some computing components may be unintentionally overloaded, and/or the like), and unintended downtimes of one or many computing components. Further, such issues are exacerbated when many applications and hardware components are used within a system (both within a closed or an open network), and it can be difficult to track each computing component's direct and indirect dependencies as new versions are introduced and as brand new components are introduced. Thus, there exists a need for a system, computer program product, and/or computer implemented method that can determine dependencies and software change impacts in computer processing, like the disclosure provided herein.

Applicant has identified a number of deficiencies and problems associated with determining software dependencies, determining what impacts software and hardware updates may have in an overall network, and/or the like. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for determining software dependencies and software change impacts on computer processing.

In one aspect, a system for determining software dependencies and software change impacts on computer processing. In some embodiments, the system may comprise: a memory device with computer-readable program code stored thereon; at least one processing device, wherein executing the computer-readable code is configured to cause the at least one processing device to perform the following operations: identify at least one computing component within a network environment; identify historical data for the at least one computing component; apply the historical data to a dependency quotient model; generate, by the dependency quotient model, a dependency quotient based on the at least one computing component, the historical data, and a relationship between the at least one computing component and at least one secondary computing component, wherein the dependency quotient is based on at least one of an indirect upstream or downstream relationship with the at least one secondary computing component, or a direct upstream or downstream relationship with the at least one secondary computing component; and generate, based on the dependency quotient, a system architecture interface component, wherein the system architecture interface component comprises data of the at least one computing component and the at least one secondary computing component within the network environment.

In some embodiments, the computer-readable code is configured to cause the at least one processing device to perform the following operation: transmit the system architecture interface component to a user device to configure a graphical user interface of the user device with the system architecture interface component. In some embodiments, the system architecture interface component comprises a plurality of layers, and wherein the plurality of layers is associated with at least one of an infrastructure layer, a wrapper layer, or a data layer.

In some embodiments, executing the computer-readable code is configured to cause the at least one processing device to perform the following operations: receive at least one authentication credential from a user device; identify a user account based on the at least one authentication credential; and dynamically generate the system architecture interface component based on a level of authorization associated with the user account.

In some embodiments, the system architecture interface component comprises a virtual reality interface or an augmented reality interface. In some embodiments, executing the computer-readable code is configured to cause the at least one processing device to perform the following operations: identify an avatar associated with a user account of a user device; determine a current virtual location of the avatar within the system architecture interface component, wherein the system architecture interface component comprises the virtual reality interface or the augmented reality interface; and dynamically update a current view of the system architecture interface component, wherein the dynamic update comprises an expanded view of data within a layer associated with the virtual location.

In some embodiments, the dependency quotient model is a graph theory based dynamic dependency quotient determination, and wherein the dynamic dependency quotient determination is based on at least one of an indirect upstream or downstream dependency, or a direct upstream or downstream dependency.

In some embodiments, executing the computer-readable code is configured to cause the at least one processing device to perform the following operations: generate a decentralized digital ledger of the at least one computing component, wherein the decentralized digital ledger comprises a ledger block for each version of the at least one computing component based on at least the historical data; and dynamically update the decentralized digital ledger based on the dependency quotient of each version, performance data of each version, and at least one computing component impact for each version. In some embodiments, the system architecture interface component comprises the decentralized digital ledger.

In some embodiments, the historical data comprises at least one of incident ticket data, code inherence data, database relationship data, or access management relationship data.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
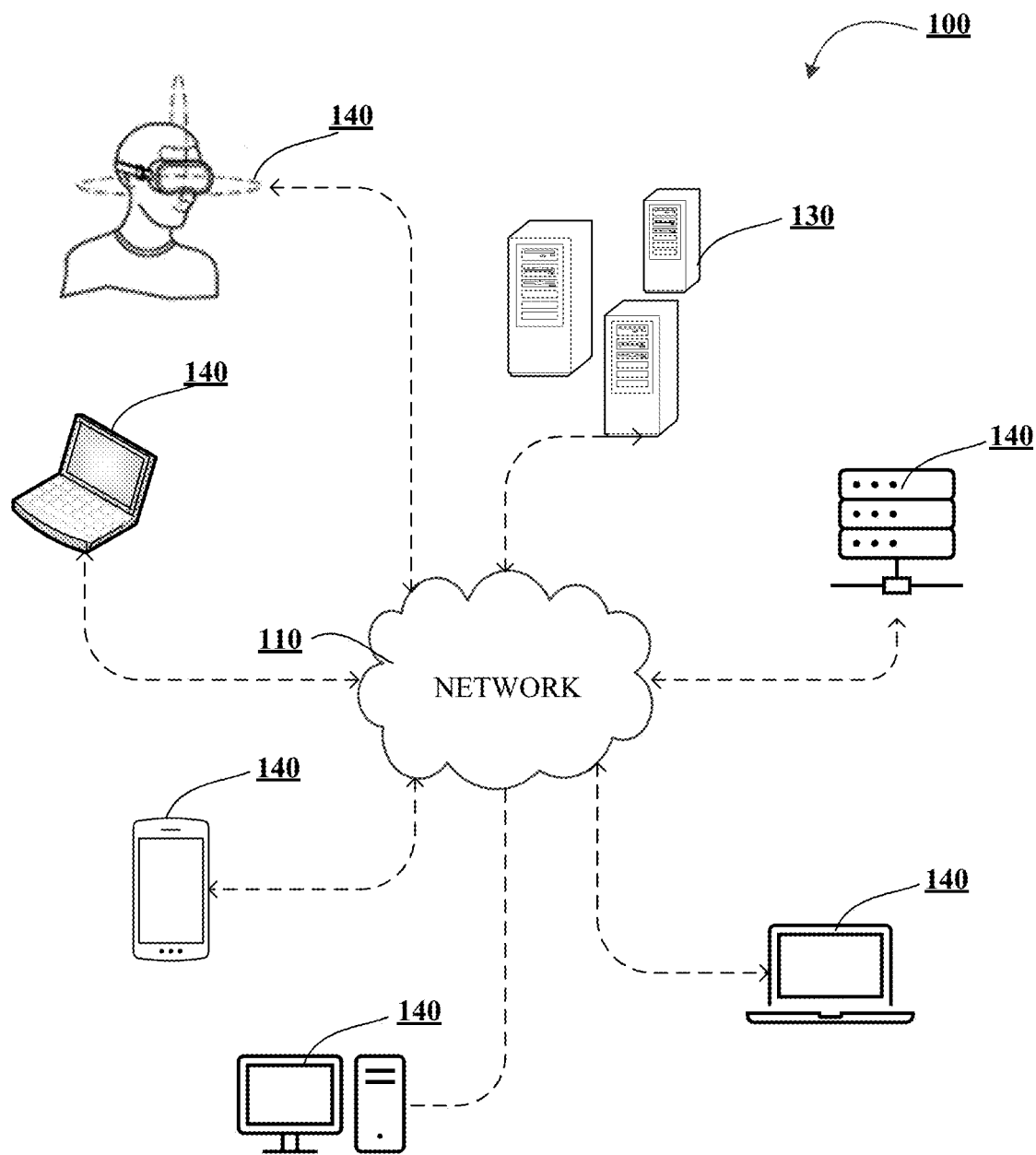
Figure 1B:
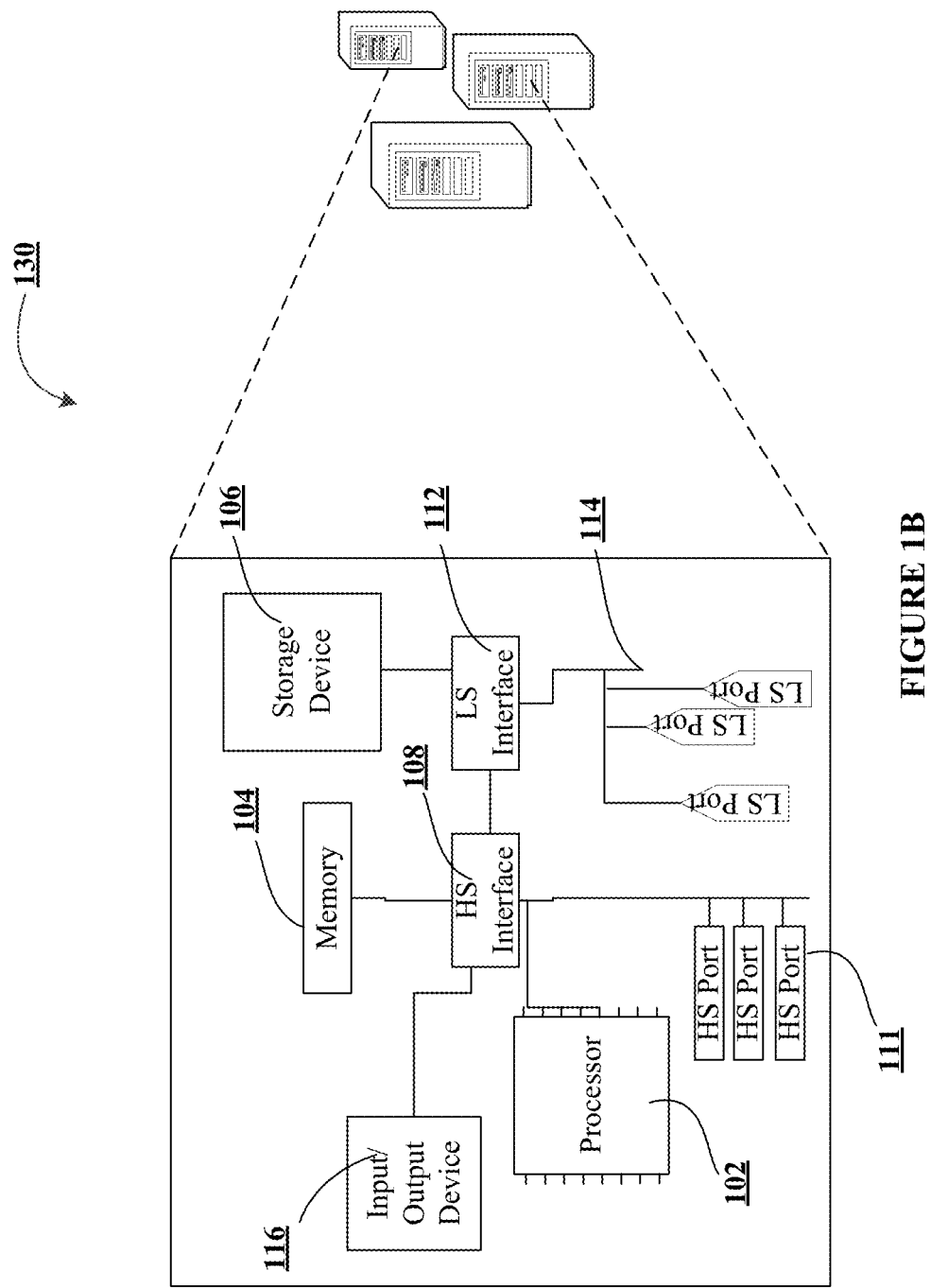
Figure 1C:
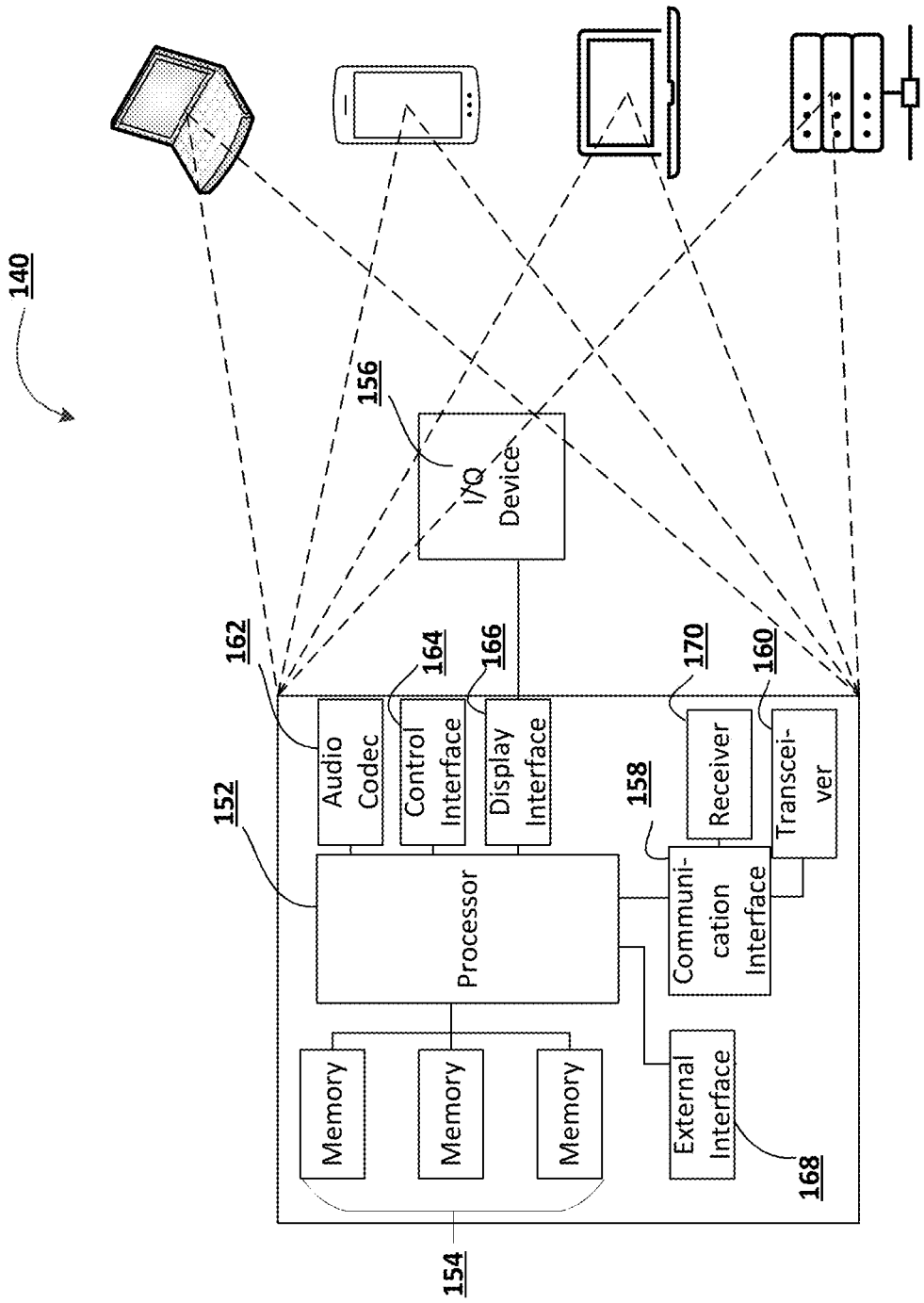
Figure 2:
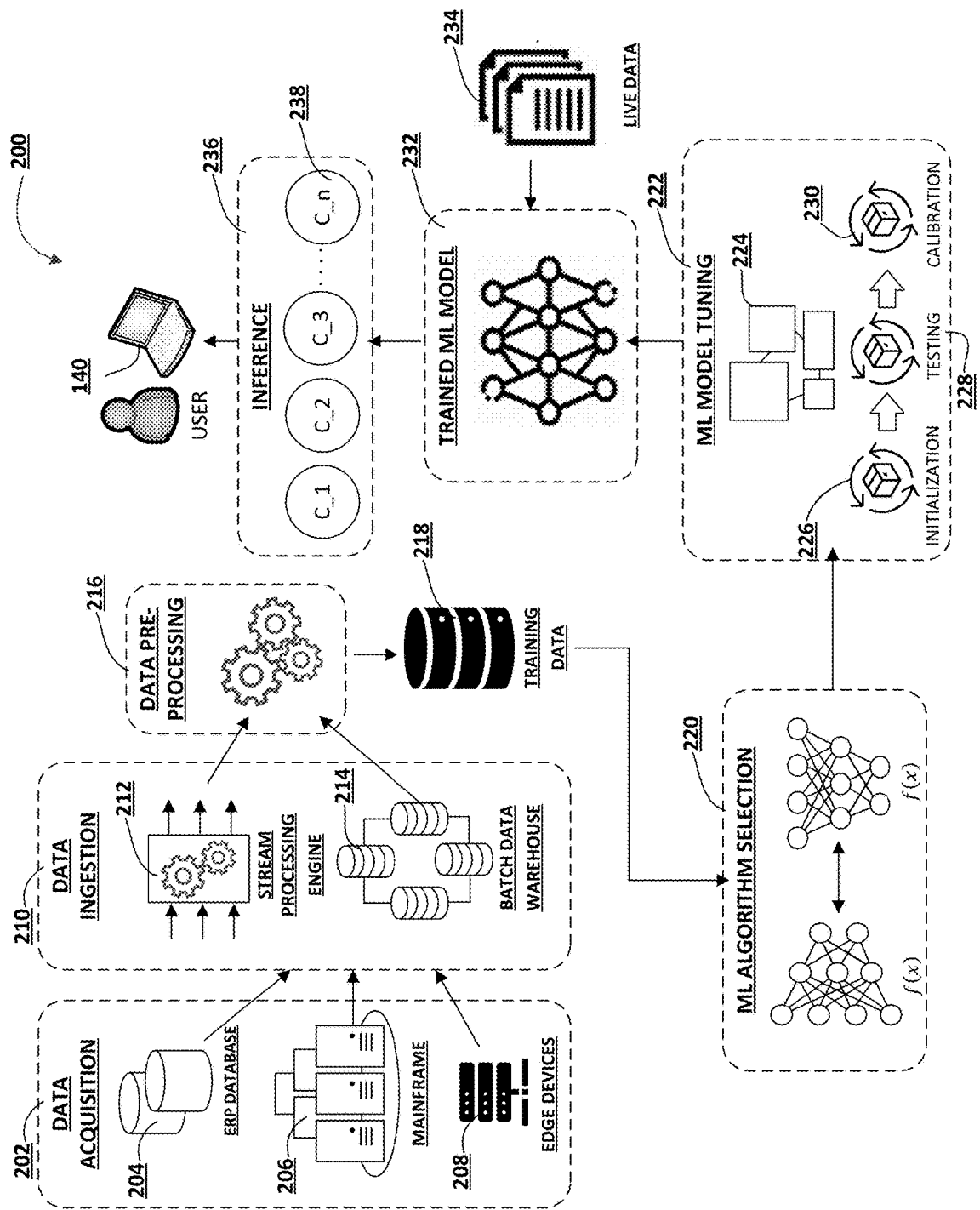
Figure 3:
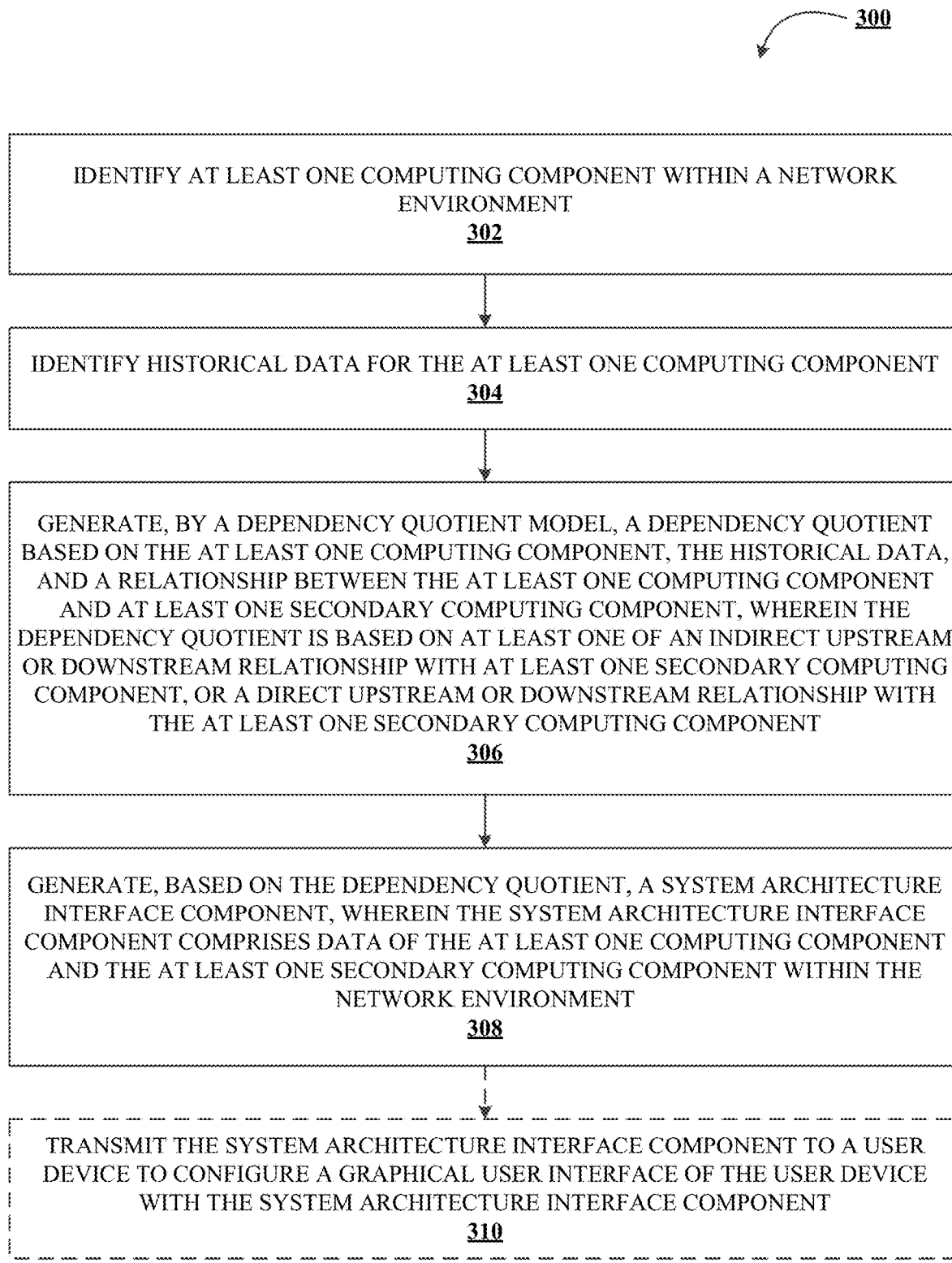
Figure 4:
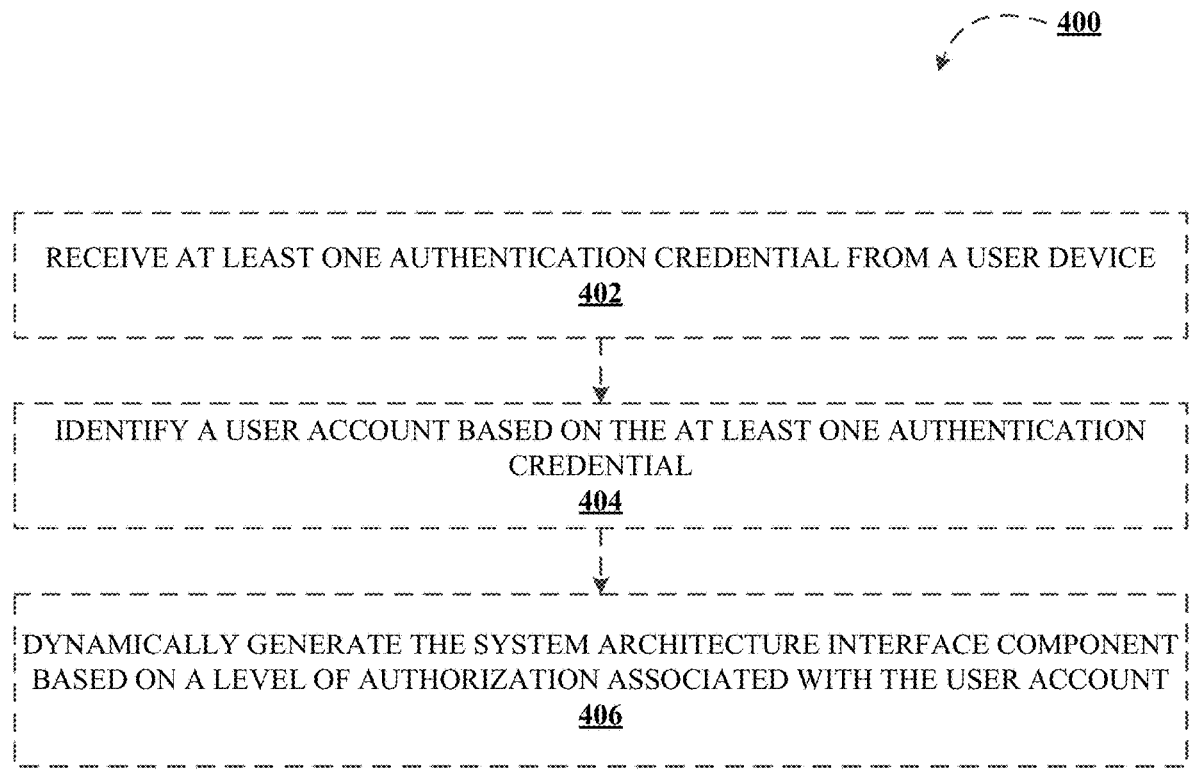
Figure 5:
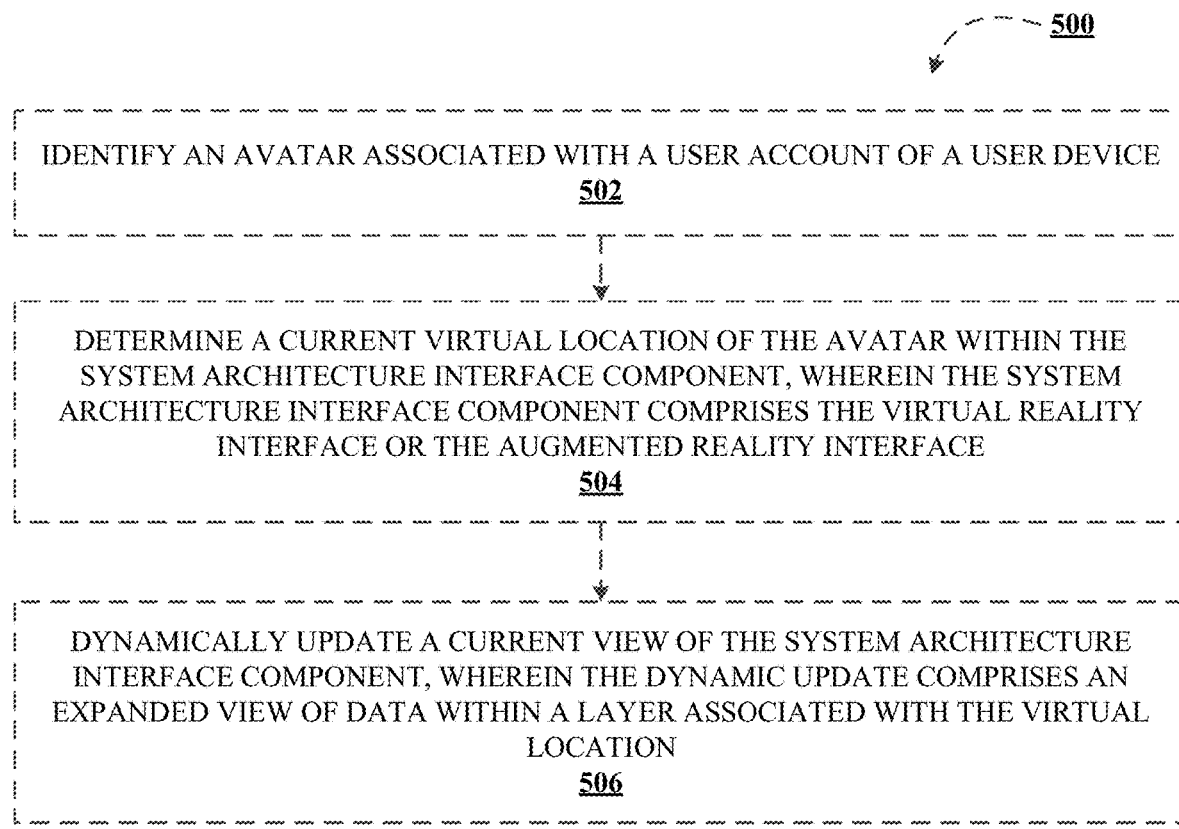
Figure 6:
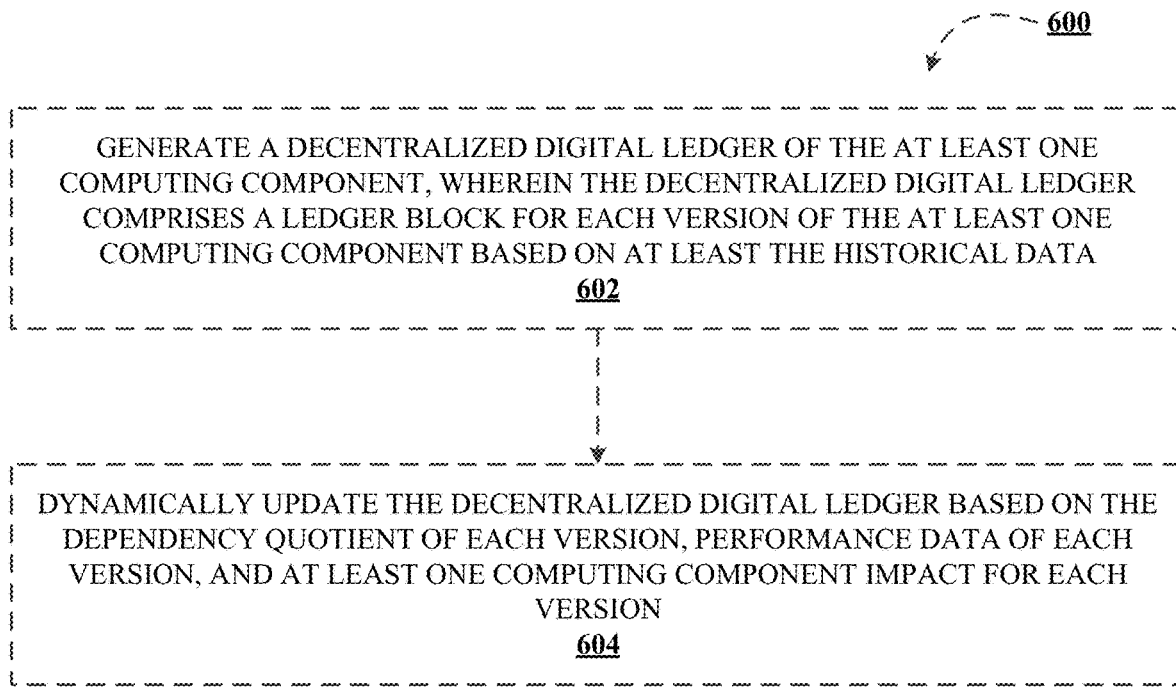

FIGS. 1A-1C illustrates technical components of an exemplary distributed computing environment for determining software dependencies and software change impacts on computer processing, in accordance with an embodiment of the disclosure;

FIG. 2 illustrates an exemplary machine learning (ML) subsystem architecture 200, in accordance with an embodiment of the disclosure;

FIG. 3 illustrates a process flow for determining software dependencies and software change impacts on computer processing, in accordance with an embodiment of the disclosure;

FIG. 4 illustrates a process flow for dynamically generating a system architecture interface component, in accordance with an embodiment of the disclosure;

FIG. 5 illustrates a process flow for dynamically updating a current view of the system architecture interface component with an expanded view of data within a layer, in accordance with an embodiment of the disclosure; and FIG. 6 illustrates a process flow for dynamically updating the decentralized digital ledger based on the dependency quotient of each version of a computing component, performance data of each version, and at least one computing component impact for each version, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

In network environments, especially electronic network environments where numerous computing components (e.g., software applications, hardware components, ands/or the like) are used and updated regularly, it can be difficult to identify all of the dependencies between these computing components. Such dependencies that are not accurately identified and tracked continuously may lead to decreased operational efficiencies, lowered processing times (such as where some computing components may be unintentionally overloaded, and/or the like), and unintended downtimes of one or many computing components. Further, such issues are exacerbated when many applications and hardware components are used within a system (both within a closed or an open network), and it can be difficult to track each computing component's direct and indirect dependencies as new versions are introduced and as brand new components are introduced. Thus, there exists a need for a system, computer program product, and/or computer implemented method that can determine dependencies and software change impacts in computer processing, like the disclosure provided herein.

The disclosure provides a system for determining software dependencies by generating a dependency quotient for each application, and generating a dependency graph for the entire computing processing system. Based on this dependency graph (such as through a system architecture interface component comprising each of the computing components within the system environment/network environment), the invention can be used to determine whether to implement software changes, draw back potential software changes, re-implement previous versions of software versions, and/or the like, based on how the software changes will impact dependent applications and computer processing. Additionally, and in some embodiments, blockchain may be implemented to track and record each version of the software changes and their individual dependency graphs, performance metrics, and/or the like.

Accordingly, the present disclosure provides an identification of at least one computing component within a network environment; an identification of historical data for the at least one computing component; and an application of the historical data to a dependency quotient model. Additionally, the present disclosure further provides for the generation, by the dependency quotient model, of a dependency quotient based on the at least one computing component, the historical data, and a relationship between the at least one computing component and at least one secondary computing component, wherein the dependency quotient is based on at least one of an indirect upstream or downstream relationship with the at least one secondary computing component, or a direct upstream or downstream relationship with the at least one secondary computing component. Lastly, and at least, the present disclosure further provides the generation, based on the dependency quotient, of a system architecture interface component, wherein the system architecture interface component comprises data of the at least one computing component and the at least one secondary computing component within the network environment.

What is more, the present disclosure provides a technical solution to a technical problem. As described herein, the technical problem includes the determination of software and hardware dependencies within an electronic network and the potential impacts of these computing components when new versions or new components are introduced (including before they are introduced so that any issues may be mitigated at the forefront). The technical solution presented herein allows for the accurate, efficient, and secure determination of dependencies and software change impacts within computer processing components. In particular, the disclosure provided herein discloses improvements over existing solutions to determining and tracking dependencies in computing components and software change impacts, (i) with fewer steps to achieve the solution, thus reducing the amount of computing resources, such as processing resources, storage resources, network resources, and/or the like, that are being used (e.g., such as by using the dependency quotient and the generation thereof); (ii) providing a more accurate solution to problem, thus reducing the number of resources required to remedy any errors made due to a less accurate solution (by accurately tracking each software impact change and dependencies with the dependency quotient, the system can more accurately predict an application or hardware component's impact when a new version or new component is introduced); (iii) removing manual input and waste from the implementation of the solution, thus improving speed and efficiency of the process and conserving computing resources (e.g., by using the dependency quotient model); (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for determining software dependencies and software change impacts on computer processing 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, augmented reality (AR) devices/headsets, virtual reality (VR) devices/headsets, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, VR headsets, AR headsets, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components.

In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the disclosure. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow 300 for determining software dependencies and software change impacts on computer processing, in accordance with an embodiment of the disclosure. In some embodiments, a system (e.g., similar to one or more of the systems described herein with respect to FIGS. 1A-1C and 2) may perform one or more of the steps of process flow 300. For example, a system (e.g., the system 130 described herein with respect to FIG. 1A-1C) may perform the steps of process 300. Additionally, and in some embodiments, a system (e.g., the system 200 described herein with respect to FIG. 2) may be used to perform the steps of process 300.

As shown in block 302, the process flow 300 may include the step of identifying at least one computing component within a network environment. For example, the system may identify the at least one computing component, which may be based on receiving a request to analyze the computing component and its dependencies (both indirect and direct), by receiving an incident ticket (e.g., indicating that the computing component is undergoing processing speed issues, storage issues, and/or the like), by routine identification of the computing component (e.g., the computing component is re-analyzed at routine intervals, such as daily, weekly, and/or the like), and/or the like. In some embodiments, by receiving an incident ticket, the incident ticket may be generated automatically within the system itself, within the overall network environment, within a computing component connected to the system over a network, and/or the like.

As used herein, the term "computing component" refers to hardware and/or software components, such as software applications, software databases, libraries, hardware devices and drivers, processors, memory devices, power supply units, operating systems, device drivers, and/or the like. Such computing components may be isolated within a network environment, such as an electronic network (hardwired, wireless, and/or the like) that connects two or more computing components, computers, and/or the like, such that they may communicate and work together. In some embodiments, the network environment may be isolated such that outside internet capabilities are not allowed, and connection to other computing components and/or computers over an internet connection.

As shown in block 304, the process flow 300 may include the step of identifying historical data for the at least one computing component. For instance, the system may identify historical data associated with the computing component(s) based on accessing a database of metadata regarding the computing component, which may comprise but is not limited to previous incidents (e.g., previous incidents regarding the component's performance, including incident ticket data), code inheritance data (e.g., code inheritance data for code that is shared between other computing components), database relationship data (e.g., what databases the computing component has interacted with previously), access management data (e.g., previous access requests for the computing component and the associated user accounts, applications, libraries, and/or the like that requested access), and/or the like. In some embodiments, and in order to trigger or start the process described herein with respect to process flow 300, an incident ticket will be received and/or identified for the computing component that is identified in block 302.

As used herein, the historical data may comprise all the previous interactions, previous access requests, previous incidents, previous dependencies that were tracked, and/or the like, and the associated timestamps of each piece of historical data (e.g., when the incident ticket was generated, when the access request was received/identified, when the dependencies were determined, and/or the like). In this manner, and in some embodiments, the system may determine a high likelihood, probability, or determination that a dependency is more likely when the historical data was most recent to the current time.

As shown in block 306, the process flow 300 may include the step of generating—by a dependency quotient model—a dependency quotient based on the at least one computing component, the historical data, and a relationship between the at least one computing component and at least one secondary computing component, wherein the dependency quotient is based on at least one of an indirect upstream or downstream relationship with at least one secondary computing component, or a direct upstream or downstream relationship with the at least one secondary computing component. As used herein, the dependency quotient refers to the relationship between a primary computing component (e.g., the computing component being analyzed by the system to determine its potential dependent computing components which may be impacted if a change is implemented to the primary computing component) and the computing components the primary computing component may impact when a change or update occurs. In this manner, the dependency quotient may be used to quantify a likelihood of impact to the potential dependent computing components before a change or update goes live for the primary computing component. In some embodiments, such a dependency quotient may comprise a value (such as a percentage of probability that an impact will occur for each potentially dependent computing component), a level (e.g., a critical level for those computing components that will be the most impacted, a medium level for those computing components that may be impacted but not critically, a low level for those computing components that may be impacted only minimally, and/or the like), and/or the like. In some embodiments, such a dependency quotient may be compared against a dependency quotient threshold (or a plurality of dependency quotient thresholds) to determine the level the impact may be for the potential computing component(s). In such embodiments, the dependency quotient threshold(s) may be predetermined by the system itself (e.g., based on historical dependency quotients and their associated impacts on the computing components, based on the training of the machine learning model, and/or the like), by a manager of the system, by a client of the system (e.g., a client using the system to determine its computing components and their impacts), and/or the like.

In some embodiments, the dependency quotient may be generated based on a plurality of factors and/or elements, whereby only one or more factors may be necessary to generate the dependency quotient and/or all the elements must be present to generate the dependency quotient. In such embodiments, the dependency quotient may depend upon such data as change request data (CRQ) (e.g., historical incidents) of the computing component(s) (such as the primary computing component being analyzed and any other potential secondary computing components/potential dependent computing components); library access data; database access data; access request data; hardware components accessed or triggered; and/or the like. In some embodiments, and upon identifying the data herein described, the system may pre-process and enrich the historical data in order to determine whether any redundancies are present, whether the data needs to be filtered or cleansed (e.g., to filter out any major outliers), whether the data should be weighted to a greater level or lower level (e.g., weighted higher to indicate an importance within the overall computing system/network environment0, and/or the like.

As used herein, the dependency quotient model is a model configured to generate a dependency quotient for each computing component analyzed by the system (e.g., the primary computing component that is being analyzed and each of its dependent computing components that may be recognized by the system), such that each computing component (e.g., software application, hardware component, and/or the like) has at least one dependency quotient with respect to the primary computing component (and/or other computing components within the electronic network). In this manner, each computing component may be accurately tracked to determine their dependencies on all the other computing components within the overall electronic network, overall computing system, and/or the like.

Additionally, such a dependency quotient model may comprise a graph-theory based dynamic dependency quotient determination, such that each computing component (e.g., potential dependent computing components) are analyzed both in an upstream (i.e., upstream from the primary computing component being analyzed) and in a downstream (i.e., downstream from the primary computing component being analyzed) manner.

In some embodiments, the dependency quotient model may comprise a decision tree based on the historical data, the factors of the historical data and/or the elements of the historical data, whereby the decision tree may be used to determine the proper level or value of the dependency quotient(s) for each dependent computing component. In some embodiments, the dependency quotient model may comprise a pre-determined algorithm of how to score and weight each historical data piece (e.g., such as scoring or weighting the most current or most previous historical data as most important to determining the dependency quotient), and whereby the pre-determined algorithm may further comprise an algorithm for determining the dependency quotient for each computing component based on this historical data. In some embodiments, the dependency quotient model may comprise machine learning (e.g., such as the machine learning model shown and described above with respect to FIG. 2), which may be pre-trained on previous collections of historical data for the computing components within the electronic network and then continuously refined and retrained based on the current dependency quotients generated and the current impacts of those determined dependencies when new version or new computing components are released. For instance, and in some embodiments, the system—using the machine learning model—may use a feedback loop of the determined dependency quotients for each potentially dependent computing component and determine whether the dependency quotients were correct based on the impact of each computing component when a new version of the primary computing component is released or goes live.

As used herein, the at least one secondary computing component refers to the potential computing components that may depend on and be impacted by a change or update to the primary computing component. In some embodiments, the at least one secondary computing component may be identified based on a user-request to analyze the all the primary computing components that the secondary computing component depends on or will be impacted by. In some embodiments, the secondary computing component may be identified by the system itself, based on identify all the potential dependent computing components, or by identifying only those potential computing components that meet or exceed a dependent quotient threshold, and/or the like.

In some embodiments, the dependency quotient model is a graph theory based dynamic dependency quotient determination, and the dynamic dependency quotient determination is based on at least one of an indirect upstream or downstream dependency, or a direct upstream or downstream dependency. For instance, and used herein, the term direct upstream or direct downstream dependency refers to those computing components that are directly related (e.g., one degree removed) from the primary computing component. Further, and as used herein, the term upstream refers to the direction of the relationship where the upstream component is the supply or input to the downstream component (e.g., the primary computing component being analyzed) and downstream refers to the recipient of the output from the computing component. Additionally, and as used herein, the terms indirect upstream or indirect downstream refers to those computing components that are indirectly related (e.g., two or more degrees removed) the primary computing component.

In some such embodiments, and based on this upstream and downstream identification of direct and/or indirect computing components that may or may not comprise dependencies, the system may generate a dependency graph which may be used, in turn, to generate the overall system architecture of the system architecture interface component described in further detail below. Such a dependency graph may show each of the computing components within the system environment, each of their dependencies and impacts, and other such data that is mentioned herein.

In some embodiments, the dependency quotient may be based on a clustering method of the factors from the historical data. For example, and in some embodiments, the clustering method may comprise clustering or grouping certain factors (such as the metadata regarding each of the incident tickets, including the impact type of the incident tickets and the ticket timestamps) and the cluster may be used to generate a clustered weightage for both pieces of metadata (e.g., where the more recent the ticket timestamps, the greater the weightage for the metadata). Similarly, and by way of example, metadata regarding multiple instances of change request data (CRQ data) which are causally linked to another primary computing component's changes or updates, and which has been tracked as happening in multiple instances, such metadata may be clustered and weighted heavier to indicate that there is a high likelihood of dependency based on multiple instances of CRQ outcomes for the potential dependent computing components. In this manner, and in such embodiments, the system may accurately and efficiently determine weightages for metadata based on all the historical metadata, rather than individually generating and applying weightages to each, separate instance. In some such embodiments, the clustering of metadata may allow for the filtering of redundant data which may otherwise be considered multiple times, rather than only once and only with other similar data.

As shown in block 308, the process flow 300 may include the step of generating—based on the dependency quotient—a system architecture interface component, wherein the system architecture interface component comprises data of the at least one computing component and the at least one secondary computing component within the network environment. For example, the system may—based on the dependency quotient(s) generated—a system architecture interface component to show a user the system architecture, the individual computing components within the system architecture, and the computing components' dependencies and impacts. Thus, and as used herein, the system may generate data and metadata regarding each of the computing components in a system environment (e.g., a computing system environment) and/or in a network environment, which may further comprise the data regarding the performance of each of these computing components, the dependencies between each of these computing components, and/or the like. Once such data and metadata are generated and collected, the system may organize the data into a data packet that may be transmitted to a user device and used to automatically configure the user device to show a user of the user device the computing components and their associated data. In some embodiments, the system architecture interface component may configure the user device's graphical user interface (GUI) to show the data of the computing components within the system environment to a user of the user device in a human-readable format.

In some embodiments, the system architecture interface component may dynamically change what it shows the user based on who the user is (e.g., based on the data the user should be able to access such as what the user is authorized to access or see, and/or the like). For instance, and in some embodiments, the system may dynamically change or update the system architecture interface component based on which user is viewing the system architecture interface component. For instance, and in some embodiments, if a user that is attempting to view certain data in the system architecture interface component, but does not have the correct credentials or access to do so, then the system architecture interface component may only show the data that the user does have access to view. Similarly, and in some embodiments, only certain users may need to view all the data of each computing component—including previous performance data, why a version of the computing component was changed or updated, and/or the like—in order to complete a required task, then the system may show such data only to that user and others in a similar position to the user. In some such embodiments, the system will use authentication credentials from the user to make this determination and dynamically change the system architecture interface component. Such embodiments are described in further detail below with respect to FIG. 4.

In some embodiments, the system architecture interface component may comprise a virtual reality interface or an augmented reality interface. Such an embodiment is described in further detail below with respect to FIG. 5. In some embodiments, the virtual reality interface or the augmented reality interface may comprise at least one of a four-dimensional (4D) view or a five-dimensional (5D) view, and the 5D view may comprise a time dimension. For example, in the embodiments where the user device is an AR or VR headset, the system architecture interface component may comprise a 4D interface for the user to interact with the data of the computing components within the system environment. In such embodiments, the 4D interface may comprise dimensions that can be expanded as the user moves through the virtualized system environment, such that as the user moves closer to a computing component within the system environment, the data of the computing component is expanded to show greater details of the computing component (such as performance details of the current version of the computing component, dependencies of the current version, and/or the like). Similarly, and in some embodiments, the system architecture interface component may comprise a 5D interface for the user, which may additionally comprise a time dimension to the 4D interface. Thus, and by of example, a user may interact with and view the data of a computing component within the AR/VR environment, which may comprise performance data, dependency data, and timestamped versions of historical computing component versions that were previously used, their performance data, and their dependency data. In this manner, a user may view each of the versions of the computing components, including data on when the computing components were released and implemented, the performance of each version, and the reason why a new version was introduced. For instance, a user may be put on the AR/VR headset, view the data of the system architecture interface component, which may dynamically change (e.g., the data may be expanded as the user moves within the AR/VR environment, such as when the user moves through the layers of each computing component's data or layers within the virtual environment) based on the user's current view.

In some embodiments, the system may generate a dependency report of each of the computing components that comprise direct and indirect dependencies from the at least one computing component. In some embodiments, the system—when analyzing a computing component that has not yet been introduced to the network environment—may analyze the potential dependencies of the potential computing component before the computing component goes live (e.g., is implemented within the network environment). For example, and in some embodiments, the dependency report may comprise an identification of the primary computing component (e.g., the computing component that has not yet been changed or introduced) and an identification of each of the dependent computing components that will be impacted by the introduction/change of the primary computing component. In some such embodiments, the identification of the dependent computing components may comprise computing component identifiers which are unique to each computing component within the system environment and/or network environment, the dependency quotient of each of the dependent computing components, and in some embodiments, the actual impact to the dependent computing components if the change is implemented (e.g., a term, phrase, sentence, explanation, and/or the like, indicating what the impact will comprise).

In some embodiments, and as shown in block 310, the process flow 300 may include the step of transmitting the system architecture interface component to a user device to configure a graphical user interface (GUI) of the user device with the system architecture interface component. For example, and in some embodiments, the system may transmit the system architecture interface component to a user device, which may automatically configure the GUI of the user device and/or interface within an AR/VR headset with the data of the system architecture interface component. Such a transmission may occur over a network (such as network 110 of FIG. 1A), within the network environment where the primary computing component is being analyzed, and/or the like. In some embodiments, the transmission of the system architecture interface component may be transmitted within the user device itself, which comprises the system (such as via an application downloaded to the user device, and/or the like) and such a transmission may automatically configure the user device's GUI to show the data of the system architecture interface component.

In some embodiments, the system architecture interface component may comprise a plurality of layers, and the plurality of layers may be associated with at least one of an infrastructure layer, a wrapper layer, and/or a data layer. For example, and in some embodiments, the system may generate the system architecture interface component to comprise a plurality of layers, whereby as the user interacts with, moves through (e.g., virtually within the AR/VR environment), and/or the like, the view of the data within the system architecture interface component may dynamically change to show different layers of each computing component. Such layers may comprise, but are not limited to, an infrastructure layer, a wrapper layer, a data layer, and/or the like.

As used herein, the infrastructure layer comprises data regarding the access requests of the computing component(s), data that is often requested by other applications, requests, and/or the like, and other such data related to communications with external systems. As used herein, the wrapper layer comprises data regarding the computing component's functions and/or code that wrap around other program components, which may comprise data regarding which program components/computing components are interrelated with the current computing component being viewed with the wrapper layer. As used herein, the data layer comprises data regarding access requests to data stored for the computing component, other such software application data, business logic, and/or the like. Thus, and in such embodiments, the user may virtually move (e.g., via the AR/VR headset and virtual environment) through the layers of each computing component, and such data of each layer may be expanded to show the details of the data of each layer as the user moves within each layer.

FIG. 4 illustrates a process flow 400 for dynamically generating a system architecture interface component, in accordance with an embodiment of the disclosure. In some embodiments, a system (e.g., similar to one or more of the systems described herein with respect to FIGS. 1A-1C and 2) may perform one or more of the steps of process flow 400. For example, a system (e.g., the system 130 described herein with respect to FIG. 1A-1C) may perform the steps of process 400. Additionally, and in some embodiments, a system (e.g., the system 200 described herein with respect to FIG. 2) may be used to perform the steps of process 400.

In some embodiments, and as shown in block 402, the process flow 400 may include the step of receiving at least one authentication credential from a user device. In some embodiments, and by of example, the system may receive and/or identify at least one authentication credential associated with a user of a user device, whereby the at least one authentication credential may be used to identify a user account associated with the system environment or network environment comprising the computing component. In some such embodiments, the user account may comprise a security access level, which may be used by the system to determine how much data and what types of data the user is allowed to view and interact with. By way of example, a user account may be associated with only a business account within a client of the system, and thus, the user may not need to view all the metadata regarding each of the dependencies for each computing component, but the user may need to view which computing components may be impacted on a surface-level (e.g., by computing component identifiers and the potential impacts explained, without more) so that the user is aware of the potential impacts.

In some embodiments, and as shown in block 404, the process flow 400 may include the step of identifying a user account based on the at least one authentication credential. By way of example, and in some embodiments, the system may identify the user account based on the receipt (such as from a user device associated with the user) and/or identification of the at least one authentication credential, such as where the at least one authentication credential comprises a user account identifier, email address, user account number, user identification sequence (e.g., such as first name and last name of the user), and/or the like. In some embodiments, the system may require at least two authentication credentials from a user (such as a username and password) before generating the system architecture interface component and transmitting the system architecture interface component to the user's user device.

In some embodiments, and as shown in block 406, the process flow 400 may include the step of dynamically generate the system architecture interface component based on a level of authorization associated with the user account. For example, and in some embodiments, the system may dynamically generate the system architecture interface component based on the level authorization (e.g., the security level) of the user account, such that only the data of the computing components within the system environment/network environment will be shown to the correct users—those users that have the authorization to view the data. In some such embodiments, the users may not be able to view all the layers within the system architecture interface component, may not be able to view all the computing components, all the performance data of the computing components, and/or the like. Additionally, and in some embodiments, the authorization level may be pre-determined by a client of the system, such as a client that oversees the user account and the associated computing components.

FIG. 5 illustrates a process flow 500 for dynamically updating a current view of the system architecture interface component with an expanded view of data within a layer, in accordance with an embodiment of the disclosure. In some embodiments, a system (e.g., similar to one or more of the systems described herein with respect to FIGS. 1A-1C and 2) may perform one or more of the steps of process flow 500. For example, a system (e.g., the system 130 described herein with respect to FIG. 1A-1C) may perform the steps of process 500. Additionally, and in some embodiments, a system (e.g., the system 200 described herein with respect to FIG. 2) may be used to perform the steps of process 500.

In some embodiments, and as shown in block 502, the process flow 500 may include the step of identifying an avatar associated with a user account of a user device. For example, the system may identify a virtual avatar—such as an avatar that can be rendered within the VR/AR environment—based on specifications stored with the user account regarding the avatar chosen and/or designed by the user. In some embodiments, the virtual avatar may be generic and may be assigned—by the system—to the user account for the current session that the user will interact within the VR/AR environment. Additionally, and upon identifying the avatar for the user account, the system may input the avatar into a virtual environment comprising the system architecture interface component, such that the user can interact with the system architecture interface component via the avatar.

In some embodiments, and as shown in block 504, the process flow 500 may include the step of determining a current virtual location of the avatar within the system architecture interface component, wherein the system architecture interface component comprises the virtual reality interface or the augmented reality interface. For instance, the system may determine—as the avatar moves and interacts within the virtual environment—a current virtual location of the avatar as compared to the computing components (and their associated data) rendered within the virtual environment and their associated locations within the virtual environment. For instance, the user—via the avatar—may move within the virtualized system environment and interact with the data of the computing components that have been virtually rendered in the virtual environment, and as the avatar moves closer to or away from each rendering of the computing components, the data of the computing component may be expanded to show more information (when the avatar is closer to or within the computing component's rendering) or reduced (when the avatar moves away from the computing component).

In some embodiments, and as shown in block 506, the process flow 500 may include the step of dynamically updating a current view of the system architecture interface component, wherein the dynamic update comprises an expanded view of data within a layer associated with the virtual location. For example, the system may dynamically update or change the current view of the user within the virtual environment to expand or reduce the information associated with each computing component based on the avatar's current location as it moves from computing component to computing component. In this manner, the view of the user seeing each of the computing components and their associated data will not appear overwhelming and less computing resources will be used to show/render all the unnecessary data (e.g., the data for computing components that are nowhere near the avatar).

FIG. 6 illustrates a process flow 600 for dynamically updating the decentralized digital ledger based on the dependency quotient of each version of a computing component, performance data of each version, and at least one computing component impact for each version, in accordance with an embodiment of the disclosure. In some embodiments, a system (e.g., similar to one or more of the systems described herein with respect to FIGS. 1A-1C and 2) may perform one or more of the steps of process flow 600. For example, a system (e.g., the system 130 described herein with respect to FIG. 1A-1C) may perform the steps of process 600. Additionally, and in some embodiments, a system (e.g., the system 200 described herein with respect to FIG. 2) may be used to perform the steps of process 600.

In some embodiments, and as shown in block 602, the process flow 600 may include the step of generating a decentralized digital ledger of the at least one computing component, wherein the decentralized digital ledger comprises a ledger block for each version of the at least one computing component based on at least the historical data. For instance, the system may generate a decentralized digital ledger comprising all the versions of each computing component within the system environment/network environment, along with the timestamps of when each version was implemented/went live, the performance data of each version, the dependencies of each version, and/or the like. In some embodiments, each version's block of data may additionally comprise a reasoning for why each previous version was updated or changed. Thus, and in some embodiments, the decentralized digital ledger may comprise all the data for a user to determine what versions were previously introduced, what changed between each version, compare versions, compare performance data, compare dependencies and impacts, and/or the like.

In some embodiments, the decentralized digital ledger may be part of the system architecture interface component, such that the user may view and/or interact with each block of the decentralized digital ledger and its associated data. In some embodiments, the system architecture interface component may be configured to allow the user to view and/or interact with multiple blocks to view at least two versions of the computing component side-by-side. In some such embodiments, the at least two versions may be sequential and/or non-sequential.

In some embodiments, and as shown in block 604, the process flow 600 may include the step of dynamically updating the decentralized ledger based on the dependency quotient of each version, performance data of each version, and at least one computing component impact for each version. For instance, the system may dynamically update the decentralized digital ledger with a new block and/or with an updated block (for a current version of the computing component that already has its own block in the decentralized digital ledger) with the data regarding the performance of the current computing component, the impact of the current computing component, and/or the like. In some embodiments, the dependencies for the current computing component may additionally be included within the block, along with the identifiers for each dependent computing component, and/or the reasons for the current version's implementation as compared to the previous version(s).

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for determining software dependencies and software change impacts on computer processing, the system comprising:
   a memory device with computer-readable program code stored thereon;
   at least one processing device, wherein executing the computer-readable code is configured to cause the at least one processing device to perform the following operations:
      identify at least one computing component within a network environment;
      identify historical data for the at least one computing component;
      apply the historical data to a dependency quotient model;
      generate, by the dependency quotient model, a dependency quotient based on the at least one computing component, the historical data, and a relationship between the at least one computing component and at least one secondary computing component, wherein the dependency quotient is based on at least one of an indirect upstream or downstream relationship with the at least one secondary computing component, or a direct upstream or downstream relationship with the at least one secondary computing component; and
      generate, based on the dependency quotient, a system architecture interface component, wherein the system architecture interface component comprises data of the at least one computing component and the at least one secondary computing component within the network environment.

2. The system of claim 1, wherein executing the computer-readable code is configured to cause the at least one processing device to perform the following operation:
   transmit the system architecture interface component to a user device to configure a graphical user interface of the user device with the system architecture interface component.

3. The system of claim 2, wherein the system architecture interface component comprises a plurality of layers, and wherein the plurality of layers is associated with at least one of an infrastructure layer, a wrapper layer, or a data layer.

4. The system of claim 1, wherein executing the computer-readable code is configured to cause the at least one processing device to perform the following operations:
   receive at least one authentication credential from a user device;

identify a user account based on the at least one authentication credential; and dynamically generate the system architecture interface component based on a level of authorization associated with the user account.

5. The system of claim 1, wherein the system architecture interface component comprises a virtual reality interface or an augmented reality interface.

6. The system of claim 5, wherein executing the computer-readable code is configured to cause the at least one processing device to perform the following operations:

identify an avatar associated with a user account of a user device;

determine a current virtual location of the avatar within the system architecture interface component, wherein the system architecture interface component comprises the virtual reality interface or the augmented reality interface; and dynamically update a current view of the system architecture interface component, wherein the dynamic update comprises an expanded view of data within a layer associated with the virtual location.

7. The system of claim 5, wherein the virtual reality interface or the augmented reality interface comprises at least one of a four-dimensional view or a five-dimensional view, and wherein the five-dimensional view comprises a time dimension.

8. The system of claim 1, wherein the dependency quotient model is a graph theory based dynamic dependency quotient determination, and wherein the dynamic dependency quotient determination is based on at least one of an indirect upstream or downstream dependency, or a direct upstream or downstream dependency.

9. The system of claim 1, wherein executing the computer-readable code is configured to cause the at least one processing device to perform the following operations:

generate a decentralized digital ledger of the at least one computing component, wherein the decentralized digital ledger comprises a ledger block for each version of the at least one computing component based on at least the historical data; and dynamically update the decentralized digital ledger based on the dependency quotient of each version, performance data of each version, and at least one computing component impact for each version.

10. The system of claim 9, wherein the system architecture interface component comprises the decentralized digital ledger.

11. The system of claim 1, wherein the historical data comprises at least one of incident ticket data, code inherence data, database relationship data, or access management relationship data.

12. A computer program product for determining software dependencies and software change impacts on computer processing, wherein the computer program product comprises at least one non-transitory computer-readable medium having computer-readable program code portions embodied therein, the computer-readable program code portions which when executed by a processing device are configured to cause the processor to perform the following operations:

identify at least one computing component within a network environment;

identify historical data for the at least one computing component;

apply the historical data to a dependency quotient model;

generate, by the dependency quotient model, a dependency quotient based on the at least one computing component, the historical data, and a relationship between the at least one computing component and at least one secondary computing component, wherein the dependency quotient is based on at least one of an indirect upstream or downstream relationship with the at least one secondary computing component, or a direct upstream or downstream relationship with the at least one secondary computing component; and generate, based on the dependency quotient, a system architecture interface component, wherein the system architecture interface component comprises data of the at least one computing component and the at least one secondary computing component within the network environment.

13. The computer program product of claim 12, further comprising:

transmit the system architecture interface component to a user device to configure a graphical user interface of the user device with the system architecture interface component.

14. The computer program product of claim 13, wherein the system architecture interface component comprises a plurality of layers, and wherein the plurality of layers is associated with at least one of an infrastructure layer, a wrapper layer, or a data layer.

15. The computer program product of claim 12, further comprising:

receive at least one authentication credential from a user device;

identify a user account based on the at least one authentication credential; and dynamically generate the system architecture interface component based on a level of authorization associated with the user account.

16. The computer program product of claim 12, wherein the system architecture interface component comprises a virtual reality interface or an augmented reality interface.

17. A computer implemented method for determining software dependencies and software change impacts on computer processing, the computer implemented method comprising:

identifying at least one computing component within a network environment;

identifying historical data for the at least one computing component;

applying the historical data to a dependency quotient model;

generating, by the dependency quotient model, a dependency quotient based on the at least one computing component, the historical data, and a relationship between the at least one computing component and at least one secondary computing component, wherein the dependency quotient is based on at least one of an indirect upstream or downstream relationship with the at least one secondary computing, or a direct upstream or downstream relationship with the at least one secondary computing component; and generating, based on the dependency quotient, a system architecture interface component, wherein the system architecture interface component comprises data of the at least one computing component and the at least one secondary computing component within the network environment.

18. The computer implemented method of claim 17, further comprising:

transmitting the system architecture interface component to a user device to configure a graphical user interface of the user device with the system architecture interface component.

19. The computer implemented method of claim 18, wherein the system architecture interface component comprises a plurality of layers, and wherein the plurality of layers is associated with at least one of an infrastructure layer, a wrapper layer, or a data layer.

20. The computer implemented method of claim 17, further comprising:
receiving at least one authentication credential from a user device;
identifying a user account based on the at least one authentication credential; and
dynamically generating the system architecture interface component based on a level of authorization associated with the user account.

\* \* \* \* \*